US010992751B1

(12) United States Patent
Cudak et al.

(10) Patent No.: US 10,992,751 B1
(45) Date of Patent: Apr. 27, 2021

(54) SELECTIVE STORAGE OF A DATASET ON A DATA STORAGE DEVICE THAT IS DIRECTLY ATTACHED TO A NETWORK SWITCH

(71) Applicant: Lenovo Enterprise Solutions (Singapore) Pte. Ltd., Singapore (SG)

(72) Inventors: Gary D. Cudak, Oxford, NC (US); Fred A. Bower, III, Durham, NC (US); Ajay Dholakia, Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/836,598

(22) Filed: Mar. 31, 2020

(51) Int. Cl.
*H04L 29/08* (2006.01)
*H04L 12/26* (2006.01)
*G06F 9/50* (2006.01)
*G06F 11/30* (2006.01)
*G06F 17/00* (2019.01)

(52) U.S. Cl.
CPC ........ *H04L 67/1097* (2013.01); *G06F 9/5088* (2013.01)

(58) Field of Classification Search
USPC .................................................. 709/219–224
See application file for complete search history.

(56) References Cited

U.S. PATENT DOCUMENTS

| 2007/0219944 | A1* | 9/2007 | Liu | ...................... | G06Q 10/063 |
| 2020/0033920 | A1* | 1/2020 | Nielsen | .................. | G05B 15/02 |
| 2020/0293372 | A1* | 9/2020 | Haprian | .............. | G06F 11/3006 |
| 2020/0394072 | A1* | 12/2020 | Sreekantaswamy | .... | G06F 9/505 |

* cited by examiner

*Primary Examiner* — Jude Jean Gilles
(74) *Attorney, Agent, or Firm* — Jeffrey Streets

(57) ABSTRACT

A computer program product provides a non-volatile computer readable medium and non-transitory program instructions embodied therein, where the program instructions are configured to be executable by a processor to cause the processor to perform various operations. The operations may comprise identifying a dataset that is being used by a first workload running on a first host server within a computing system and a second workload running on a second host server within the computing system, wherein each of the host servers within the computing system are connected for communication over a network including a network switch. The operations may further comprise identifying a data storage device that is directly attached to the network switch within the network, migrating the identified dataset to the identified data storage device, and causing the first and second workloads to send dataset access requests to the identified dataset on the identified data storage device.

20 Claims, 4 Drawing Sheets

SELECTIVE STORAGE OF A DATASET ON A DATA STORAGE DEVICE THAT IS DIRECTLY ATTACHED TO A NETWORK SWITCH

BACKGROUND

The present disclosure relates to data storage on a computing system having a plurality of host servers for performing workload instances.

BACKGROUND OF THE RELATED ART

In a virtualized computing environment having a plurality of physical hosts, several virtual machine workloads may operate on a single physical host at the same time using an allocated portion of the hardware resources of the physical host. A given workload may be migrated between physical hosts at various times for various reasons, such as to balance the load on each physical host or to consolidate load on certain physical hosts so that other physical hosts can be shut down.

Since the placement of each workload can change, the datasets that are operated on by the workloads may be placed on network-attached storage to provide uniform performance and access to the data before and after the workload migration. Recently, additional software schemes have been implemented that allow for the local data storage of the physical hosts themselves to be used for the operational workload data. These software schemes can eliminate the need for a dedicated network-attached storage device.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may comprise identifying a dataset that is being used by a first workload running on a first host server within a computing system and a second workload running on a second host server within the computing system, wherein each of the host servers within the computing system are connected for communication over a network including a network switch. The operations may further comprise identifying a data storage device that is directly attached to the network switch within the network, migrating the identified dataset to the identified data storage device, and causing the first and second workloads to send dataset access requests to the identified dataset on the identified data storage device.

Some embodiments provide a computer program product comprising a non-volatile computer readable medium and non-transitory program instructions embodied therein, the program instructions being configured to be executable by a processor to cause the processor to perform various operations. The operations may comprise identifying a first dataset that is being used by a first workload running on a first host server within a computing system and a second workload running on a second host server within the computing system, wherein the first dataset is currently stored on a data storage device selected from local storage directly attached the first host server and/or a data storage device that is directly attached to a first network switch, wherein each of the host servers within the computing system are connected for communication over a network including the first network switch. The operations may further comprise causing the first workload and the second workload to access the identified dataset on the selected data storage device, and causing the second workload to use a data storage device within the network as cache, wherein the data storage device used as cache is at least one hop closer to the second host server than the selected data storage device.

Some embodiments provide a computer program product comprising a non-volatile computer readable medium and non-transitory program instructions embodied therein, the program instructions being configured to be executable by a processor to cause the processor to perform various operations. The operations may comprise identifying a workload that is to be run on a host server within a computing system including a network, identifying a dataset that will be used by the workload, and determining whether local data storage of the host server has a sufficient amount of available data storage capacity to store the dataset. The operations may further comprise identifying a data storage device that is directly attached to a network switch within the network, storing at least a portion of the identified dataset on the identified data storage device in response to determining that the local data storage device of the host server does not have a sufficient amount of available data storage capacity to store the dataset, and causing the workload to send access requests for the at least a portion of the identified dataset to the identified data storage device.

DETAILED DESCRIPTION

Figure 1:
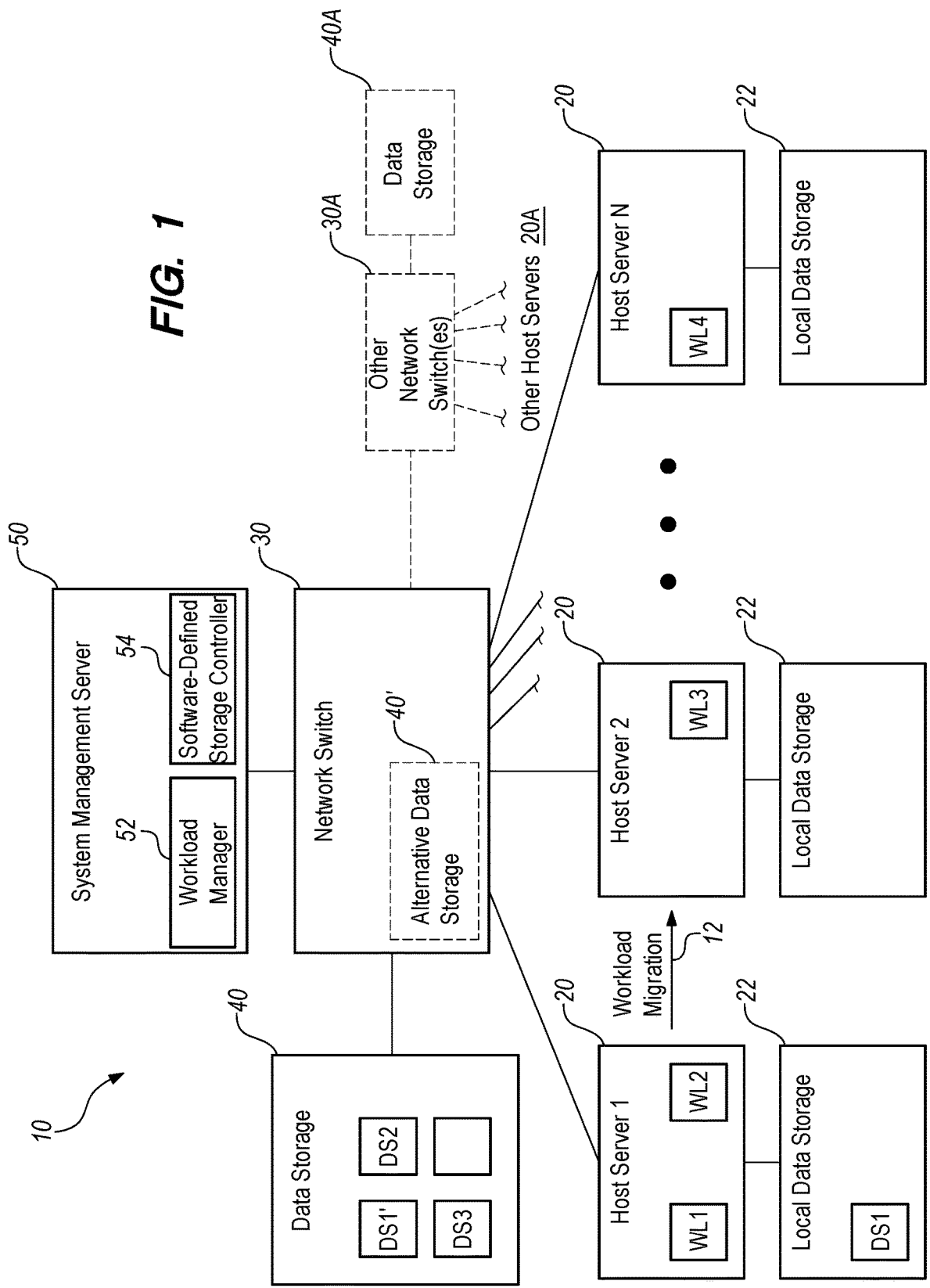
FIG. 1 is a diagram of a system including a plurality of host servers with local data storage and a network switch with a data storage device directly attached to the network switch.

Some embodiments provide a computer program product comprising a non-volatile computer readable medium and non-transitory program instructions embodied therein, the program instructions being configured to be executable by a processor to cause the processor to perform various operations. The operations may comprise identifying a dataset that is being used by a first workload running on a first host server within a computing system and a second workload running on a second host server within the computing system, wherein each of the host servers within the computing system are connected for communication over a network including a network switch. The operations may further comprise identifying a data storage device that is directly attached to the network switch within the network, migrating the identified dataset to the identified data storage device, and causing the first and second workloads to send dataset access requests to the identified dataset on the identified data storage device.

A dataset may be identified by a physical or logical address, or a filename that is associated with a particular physical or logical address. Optionally, a software-defined storage controller may track datasets and physical or logical address associated with the datasets. Furthermore, the software-defined storage controller may identify and monitor the workloads that are operating on each dataset. In a non-limiting example, the operation of identifying a dataset that is being used by a first workload running on a first host server within a computing system and a second workload running on a second host server within the computing system may include the operations of detecting read and/or write commands directed at the dataset, inspecting the read and/or write commands to identify the workloads that are sending the read and/or write commands, and identifying, for each workload sending the read and/or write commands, the host server that is running the workload.

While a dataset that is being used by multiple workloads may be moved to a data storage device that is directly attached to the network switch, some embodiments may move a dataset that is being used a single workload to local data storage of a host server that is running the single workload. Local storage of a dataset on the host server that is running the workload allows the workload to access the dataset without using any network bandwidth. In some embodiments, the operations may further comprise identifying a second dataset that is being used by a single workload running on a third host server within the computing system, wherein the second dataset is currently stored on the identified data storage device that is directly attached to the network switch, migrating the second dataset to local storage of the third host server, and causing the single workload to access the second dataset on the local storage of the third host server.

In some embodiments, the computing system may include multiple network switches, where each network switch has a data storage device directly attached to the network switch. Accordingly, if a dataset is determined to be in use by multiple workloads run on different host servers, the dataset could be stored on one of the data storage devices that is directly attached to any of the network switches. With this placement of the dataset, it is possible to avoid passing data back and forth between the host servers that run the individual workloads. However, some embodiments will identify the data storage device that is attached to the network switch that is an equal number of hops from the first host server and the second host server, and store the dataset on the identified data storage device. Preferably, a data storage device that is directly attached to the network switch only one hop from the first and second host servers. Optionally, the data storage device is directly attached to a network switch that is the fewest total number of hops from both the first and second host servers, regardless of whether the number of hops is equal for each host server. Still further, if the number of hops is unequal, then the dataset should be stored on the data storage device directly attached to a network switch that is closer to the workload with the highest frequency of access to the dataset.

In some embodiments, the operation of migrating the identified dataset to the identified data storage device may include the operation of migrating the identified dataset from local storage of one or more of the host servers to the identified data storage device. Accordingly, multiple portions of the dataset may be migrated from the local storage of multiple host servers to be consolidated on the identified data storage device. Still further, where there are multiple portions of the dataset stored across the local storage of multiple host servers and only one workload operating on the dataset, then the portion of the dataset stored on the local storage of the host server running the workload may remain on the local storage while any other portions of the dataset are migrated to the identified data storage device.

Some embodiments of the computing system support a virtualized environment in which the workload is a virtual machine workload. A workload manager running on a system management server may be responsible for provisioning a virtual machine workload to a given host server and/or responsible for migrating a virtual machine workload from one host server to another host server. Some embodiments may provision, for each host server, a virtual machine for control of data storage for virtual machine workloads running on the host server. For example, the virtual machine for control of data storage may monitor an amount available data storage capacity on the host server and report that amount to the system management server for use in determining where to place a dataset. Optionally, the virtual machine for control of data storage may map the identified storage attached to the network switch as a separate storage container.

In some embodiments, the identified data storage device is directly attached or coupled to a port of the network switch, such as a high-bandwidth port. The directly attached or coupled data storage device may take various forms, such as network-attached storage (NAS) and/or a storage area network (SAN). Alternatively, the identified data storage device may be integrated into the network switch, such as being included within a common housing with the host server. Furthermore, some embodiments may implement additional data management techniques to achieve data redundancy and performance, such as the use of various levels of RAID (redundant array of inexpensive disks) capability. In one option, the attached data storage may include a redundant array of inexpensive disks (RAID) that includes a controller and multiple disks or other data storage media.

Some embodiments provide a computer program product comprising a non-volatile computer readable medium and non-transitory program instructions embodied therein, the program instructions being configured to be executable by a processor to cause the processor to perform various operations. The operations may comprise identifying a workload that is to be run on a host server within a computing system including a network, identifying a dataset that will be used by the workload, and determining whether local data storage of the host server has a sufficient amount of available data storage capacity to store the dataset. The operations may further comprise identifying a data storage device that is directly attached to a network switch within the network, storing at least a portion of the identified dataset on the identified data storage device in response to determining that the local data storage device of the host server does not have a sufficient amount of available data storage capacity to store the dataset, and causing the workload to send access requests for the at least a portion of the identified dataset to the identified data storage device.

In some embodiments, the entire identified dataset may be stored on the local data storage of the host server that is running the workload in response to determining that the local data storage device of the host server has a sufficient amount of available data storage capacity to store the entire identified dataset. Optionally, the workload and dataset may be migrated to the host server from another host server within the computing system.

The operation of storing at least a portion of the identified dataset on the identified data storage device may be implemented in various ways. Some embodiments may store at least a portion of the identified dataset on the identified data storage device by moving portions of the identified dataset from multiple host servers within the computing system. Some embodiments may store at least a portion of the identified dataset on the identified data storage device by storing the entirety of the identified dataset on the identified data storage device. Furthermore, some embodiments may store at least a portion of the identified dataset on the identified data storage device by storing a portion of the identified dataset on the identified data storage device and storing another portion of the identified dataset on the local data storage device of the host server running the workload. It should be recognized that embodiments may enable the provisioning or performance of a workload on a given host server that has sufficient available processing resources to run the workload, but perhaps does not have sufficient available local storage for the dataset operated on by the workload.

In some embodiments, the disclosed placement and storage of datasets may be referred to as "software-defined storage" operations, where software determines the optimal locations for storage of a dataset relative to one or more workload that is operating on the dataset. Some embodiments may make use of both local storage directly attached to each host server as well as data storage directly attached to each network switch that provides a network connection to the host servers.

Some embodiments are directed to a management entity that performs control logic that makes the dataset placement decision. For example, the control logic may be included as a module of a workload manager that makes workload placement/migration decisions, or may be a separate module such as a software-defined storage controller. In some embodiments, each host server may host a virtual machine for control of data storage (i.e., a control VM), where the control VM of each host server may cooperate with other control VMs in storage management decisions and functions.

In some embodiments, the workload instances running on a host server may further make use of the data storage directly attached to or within each network switch as a high-performance cache. For example, the software-defined storage controller may assign a portion of a given data storage device to any one or more of the workload instances so that an individual workload instance may cache some data in the data storage device. By using a portion of the data storage attached to or within a given network switch as cache for a particular workload instance, it may be possible to further reduce the consumption of network bandwidth. Preferably, the data storage device that provides the cache assigned to a given workload instance running on a particular host server will be closer (i.e., fewer hops) to the host server than the data storage device that is storing the dataset in used by that particular workload instance. Accordingly, data that is used frequently by the given workload instance may be read from, and/or written to, the assigned cache which is closer to the host server running the given workload instance than the data storage device where the dataset is being stored. A coherency protocol may be used to maintain synchronization of the cache with the associated dataset. Eventually, altered data in the cache will be written back to the dataset. As a specific example, a first workload instance on a first host server and a second workload instance on a second host server may be sharing a dataset stored on local data storage attached to the first host server. However, if the second workload instance is assigned a portion of a data storage device attached to a network switch to which both the first and second host servers are connected, then the second workload instance may read and write data to the assigned cache which is a single hop from the second server instead of having to send and receive every write and read all the way to the dataset stored on the data storage device connected to the first host server. It should also be apparent that in other situations, the assigned cache could be on a data storage device attached to a network switch. For example, in a situation where the first and second workload instances sharing a dataset are running on first and second host servers separated by first and second network switches (i.e., the first host server is connected to the first network switch, the second host server is connected to the second network switch, and the first and second network switch are also connected), the dataset may be stored on a data storage device attached to the first network switch while the second workload instance may cache data on a data storage device attached to the second network switch.

Existing computing systems suffer the technical problem that a high amount of network bandwidth is consumed by the movement of data from a remote data storage device to a host server that is performing a workload requiring the data and/or moving data from the host server to the remote data storage device where the data is stored. This problem is made worse in multiple situations. In one situation, datasets are stored on a remote data storage device, such that each of the workloads on each of the host servers must transfer a portion of their dataset over the network to and from the data storage device every time the dataset is needed or updated. In another situation, a dataset for a particular workload is stored in a local storage device directly attached to the host server that is performing the workload. Unfortunately, if the size of the dataset exceeds the available (unused) storage capacity of the local storage device attached to the host server performing the workload, then some of the dataset must be stored on a local data storage device of one or more of the other host servers in the computing system. Spreading the data storage across host servers in this manner means that the workload being performed on one host server may be frequently transferring data over the network to and from the data storage devices of the other host servers as the various portions of the dataset are needed or updated. This consumes both network bandwidth generally, but specifically reduces the effective bandwidth of the other host servers due to the consumption of bandwidth by the process of providing and receiving the data to the host server that is running the workload. In yet another situation, a workload that has been running on a first host server may be migrated to a second host server, such that the dataset being stored on the local data storage device of the first host server for the migrating workload may be transferred over the network to the second host server for storage. Even more, the dataset for the migrating workload may displace or evict other data that was stored on the second host server, such that the evicted data must also be transferred over the network to another data storage location. In a still further situation, a given dataset may be shared or otherwise used or accessed by multiple workloads that may be running on, or may eventually be run on, separate host servers. Accordingly, storing the dataset on a local data storage device of the host server running one of the multiple workloads will necessarily involve transferring data from the dataset over the network to and from the host servers running each of the other workloads.

Some embodiments provide the technical solution of selectively storing a dataset on a data storage device that is directly attached to a network switch in response to the dataset being shared by virtual machine workloads on different host servers. While data transfer between the attached data storage device and the host servers running each workload will consume some network bandwidth, none of the host servers are required to send/receive data to/from other host servers. In a computing system having multiple network switches, embodiments may select one of the network switches that is close to each of the workloads that are using the dataset and storing the dataset on a data storage device that is directed attached to the selected network switch.

Some embodiments provide the technical solution of selectively storing a portion of a dataset on a data storage device that is directly attached to a network switch in response to the dataset exceeding the available storage capacity of a local storage device directly attached to the host server that is running a workload that uses the dataset. This solution reduces the bandwidth demands on the network in use by the workload and provides greater scale than using only the locally-attached storage on the server nodes, while providing similar cost advantages of existing software-defined storage solutions. In a computing system having multiple network switches, embodiments may select one of the network switches that is fewest number of hops from the workload that is using the dataset and storing the dataset on a data storage device that is directed attached to the selected network switch. Any portion of the dataset that is not stored on the data storage device directly attached to the selected network switch may be stored on the local data storage device attached to the host server that is running the workload. Preferably, the entirety of a dataset used by a workload will be stored either on the local data storage device of the host server where the workload is running or on the data storage device attached directly to the network switch. In one option, the majority or entirety of the dataset may be stored on the data storage device that is directly attached to a network switch in response to the local storage device directly attached to the host server having little or no available storage capacity. While this latter option may consume network bandwidth to provide the workload with data from the data storage device attached to the network switch, the advantage is that the additional storage capacity of the data storage device allows the workload to be performed on a host server that has processor capacity despite having little or no available data storage capacity.

EXAMPLE

In one non-limiting example, a technical problem exists in a computing system that uses software-defined storage where a dataset1 requires 10 TB of data storage and each of the host servers in the computing system have 4 TB of local storage. If a workload1 that uses dataset1 is placed on server1, then some of the dataset1 could be stored on the local storage of server1, but remaining portions of dataset1 would then typically be stored on other host servers in the same computing system. With dataset1 being 10 TB and each server having only 4 TB of local data storage, dataset1 would need to be spread across the local storage devices of at least three total servers (i.e., server1, server2 and server3). As a result, if workload1 were performed on server1, server1 would regularly send/receive data to/from server2 and/or server3. This would result in the continuous consumption of network bandwidth and would specifically reduce the effective bandwidth of server1, server2 and server3.

In this example, a technical solution that conserves network bandwidth involves storing some or all of the 10 TB dataset1 on a data storage device that is directly attached to the network switch that connects the host servers. By storing all 10 TB of dataset1 on the data storage device that is directly attached to the network switch, or atleast any portion of dataset1 that cannot be stored within the available storage capacity of the local data storage device of the host server running the workload1, the effective bandwidth of server2 and server3 are no longer negatively impacted and the number of hops required for server1 to obtain data from the data storage device directly attached to the network switch is no greater than before. So, this provides a net reduction in the consumption of network bandwidth.

FIG. 1 is a diagram of a computing system 10 including a plurality of host servers 20 each with local data storage 22 and a network switch 30 with a data storage device 40 directly attached to a high bandwidth port of the network switch. A system management server 50 and each of the host servers 20 are also connected to ports of the network switch 30.

The system management server 50 runs a workload manager 52 that performs certain system management tasks, such as provisioning workload instances to one or more of the host servers 20 and migrating workload instances among the host servers 20 for various purposes. For example, the workload management 52 may cause a workload being run on Host Server 1 to be migrated (see arrow 12) to Host Server 2 in order to improve a balance in the load on the host servers.

The system management server 50 also runs a software-defined storage controller 54 that performs certain system management tasks, such as tracking available data storage capacity on storage devices within the computing system 10 and determining where to store each dataset that is operated on by one or more of the various workloads running on the host servers 20. The storage devices available in computing system 10 include the local data storage devices 22 that are directly attached to each host server 20 and the data storage 40 that is directly attached to each network switch 30. Optionally, the data storage 40 may be included within the network switch 30, shown as alternative data storage 40'.

The computing system 10 may further include one or more additional network switch 30A (shown in a dashed outline), where each additional network switch 30A may have its own data storage 40A (shown in a dashed outline) directly attached thereto. Any additional network switches 30A may also be connected to other host servers 20A in the same manner as shown for network switch 30 and host servers 20. It should be understood that host servers 20A would typically each include a local data storage device of their own, perhaps in the same manner that each of the host servers 20 include a local data storage device 22. Furthermore, the workload manager 52 and software-defined storage controller 54 may perform certain system management tasks relative to the other host servers 20A and their local data storage devices, as well as the data storage device 40A, as described in reference to the host servers 20, local data storage devices 22, and data storage 40.

As shown, Host Server 1 is running a workload WL1 that operates dataset DS1. In this example, the local data storage 22 directly attached to Host Server 1 has sufficient available storage capacity to store the dataset DS1 and there are no other workloads using this dataset. Accordingly, the system management server 50, perhaps via the software-defined storage controller 54, causes the dataset DS1 to be stored on the local data storage 22 attached to Host Server 1 in order to prevent any network traffic when workload WL1 accesses (read or write) dataset DS1.

As further shown, Host Server 1 is running a second workload WL2. In this example, the local data storage 22 directly attached to Host Server 1 has insufficient available storage capacity to store the dataset DS2 that is operated on by the second workload WL2. So, the system management server 50, perhaps via the software-defined storage controller 54, causes the dataset DS2 to be stored on the data storage 40 attached to the network switch 30 that is the fewest number of hops from Host Server 1. Although there will be some network traffic each time that the second workload WL2 accesses the dataset DS2, the amount of network bandwidth consumed by accessing the dataset DS2 is less than if the dataset were stored on another local data storage device 22 or data storage 40A attached to one of the other network switches 30A.

Additionally shown, Host Server 2 is running a third workload WL3 and Host Server N is running a fourth workload WL4. IN this example, the workloads WL3 and WL4 are both operating on a dataset DS3. Since both workloads WL3 and WL4 are operating on the same dataset DS3, yet the workloads WL3 and WL4 are running on different host servers 20, the system management server 50, perhaps via the software-defined storage controller 54, causes the dataset DS3 to be stored on the data storage 40 attached to the network switch 30. While there will be some network traffic each time either of the workloads WL3 and WL4 access the dataset DS3, both workloads WL3 and WL4 can access the dataset DS3 in just one hop and minimize the impact on network bandwidth.

Conversely, if the dataset DS3 were stored on another local data storage device 22, say the local data storage device 22 directly attached to Host Server 2, then any data access by workload WL3 would impose any network traffic while any data access by workload WL4 would require two hops (i.e., a first hop from Host Server N to the network switch, and a second hop from the network switch to Host Server 2). While workload WL3 might experience less latency with the dataset DS3 stored locally on the same host server where WL3 is running, workload WL4 would experience greater latency. Unfortunately, the effective network bandwidth available to Host Server 2 is reduced in this scenario since Host Server 2 must now use some of its network bandwidth and processor capacity to process each data request coming from workload WL4.

Figure 2:
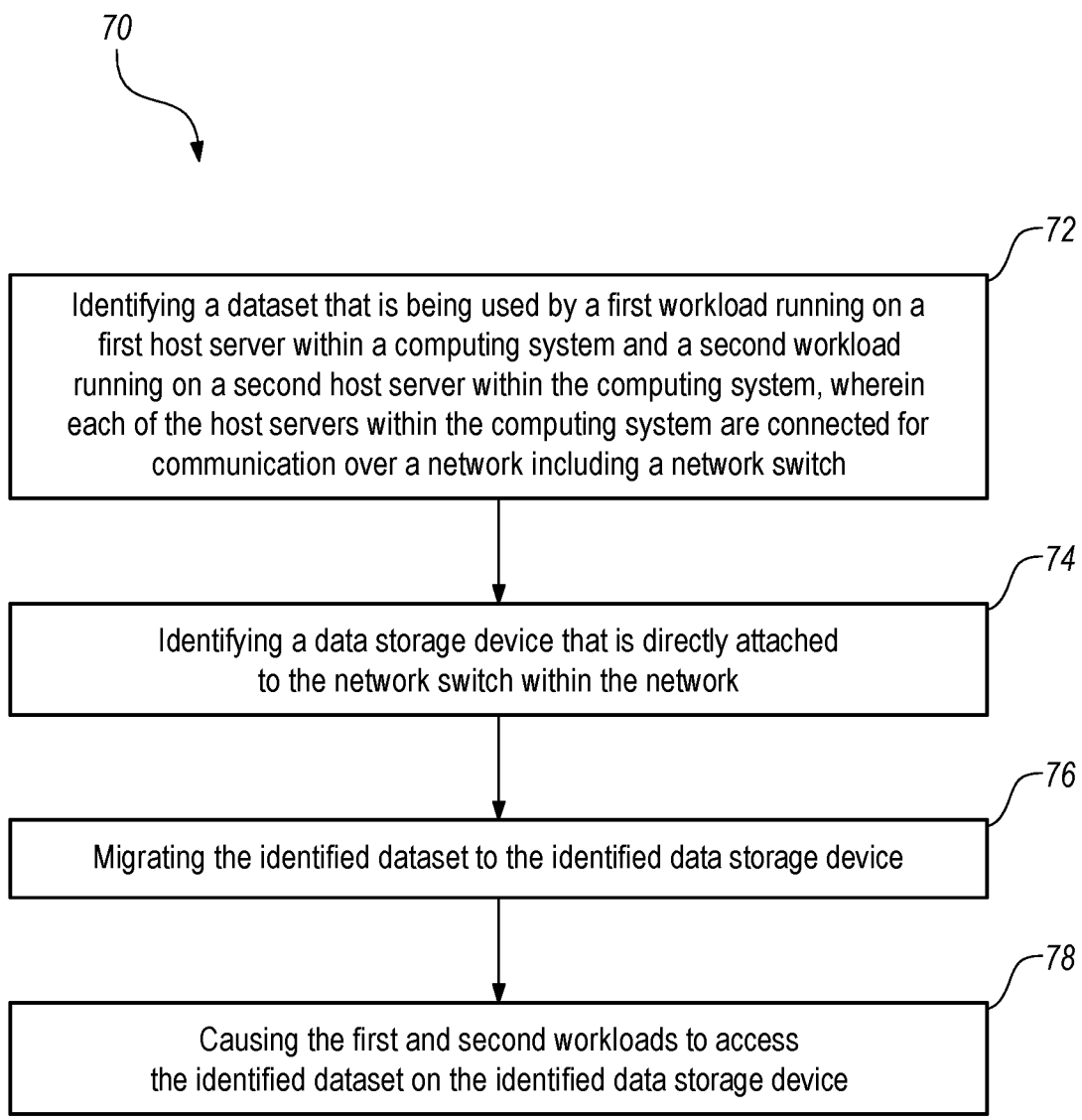
FIG. 2 is a flowchart of a method for identifying a dataset that is being used by two workloads and migrating the identified dataset to the data storage device directed attached to the network switch.

FIG. 2 is a flowchart of a method 70 for identifying a dataset that is being used by two workloads and migrating the identified dataset to the data storage device directed attached to the network switch. Operation 72 includes identifying a first dataset that is being used by a first workload running on a first host server within a computing system and a second workload running on a second host server within the computing system, wherein the first dataset is currently stored on local storage of one or more of the host servers, and wherein each of the host servers within the computing system are connected for communication over a network including a network switch. Operation 74 includes identifying a data storage device that is directly attached to the network switch within the network. Operation 76 includes migrating the identified dataset to the identified data storage device. Operation 78 includes causing the first and second workloads to access the identified dataset on the identified data storage device.

Figure 3:
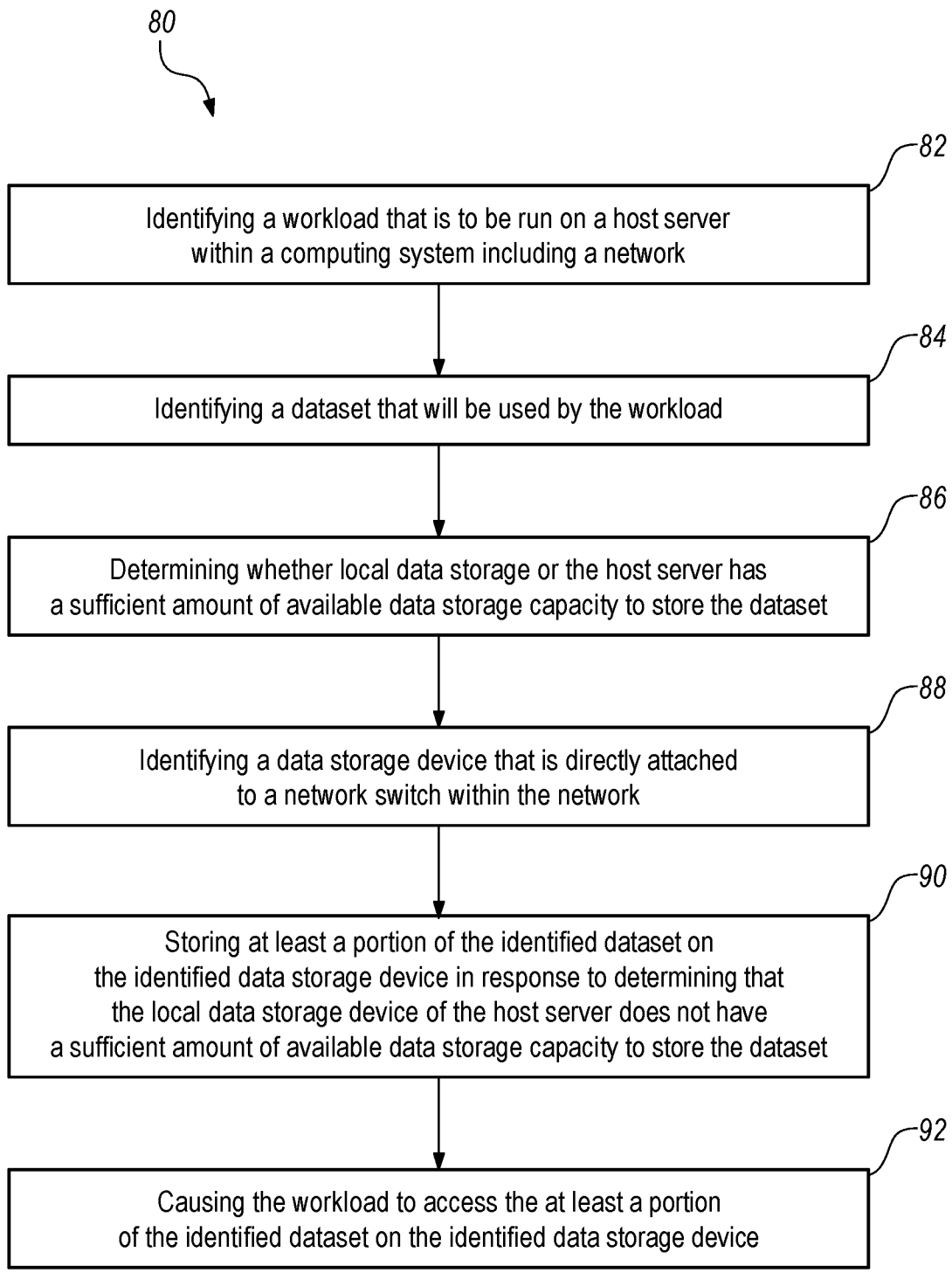
FIG. 3 is a flowchart of a method for storing at least a portion of a dataset on a data storage device directly attached to a network switch in response to determining that the local data storage device of the host server running the workload that uses the dataset does not have a sufficient amount of available data storage capacity to store the dataset.

FIG. 3 is a flowchart of a method 80 for storing at least a portion of a dataset on a data storage device directly attached to a network switch in response to determining that the local data storage device of the host server running the workload that uses the dataset does not have a sufficient amount of available data storage capacity to store the dataset. Operation 82 includes identifying a workload that is to be run on a host server within a computing system including a network. Operation 84 includes identifying a dataset that will be used by the workload. Operation 86 includes determining whether local data storage of the host server has a sufficient amount of available data storage capacity to store the dataset.

Operation 88 includes identifying a data storage device that is directly attached to a network switch within the network. Operation 90 includes storing at least a portion of the identified dataset on the identified data storage device in response to determining that the local data storage device of the host server does not have a sufficient amount of available data storage capacity to store the dataset. Operation 92 includes causing the workload to send access requests for the at least a portion of the identified dataset to the identified data storage device.

Figure 4:
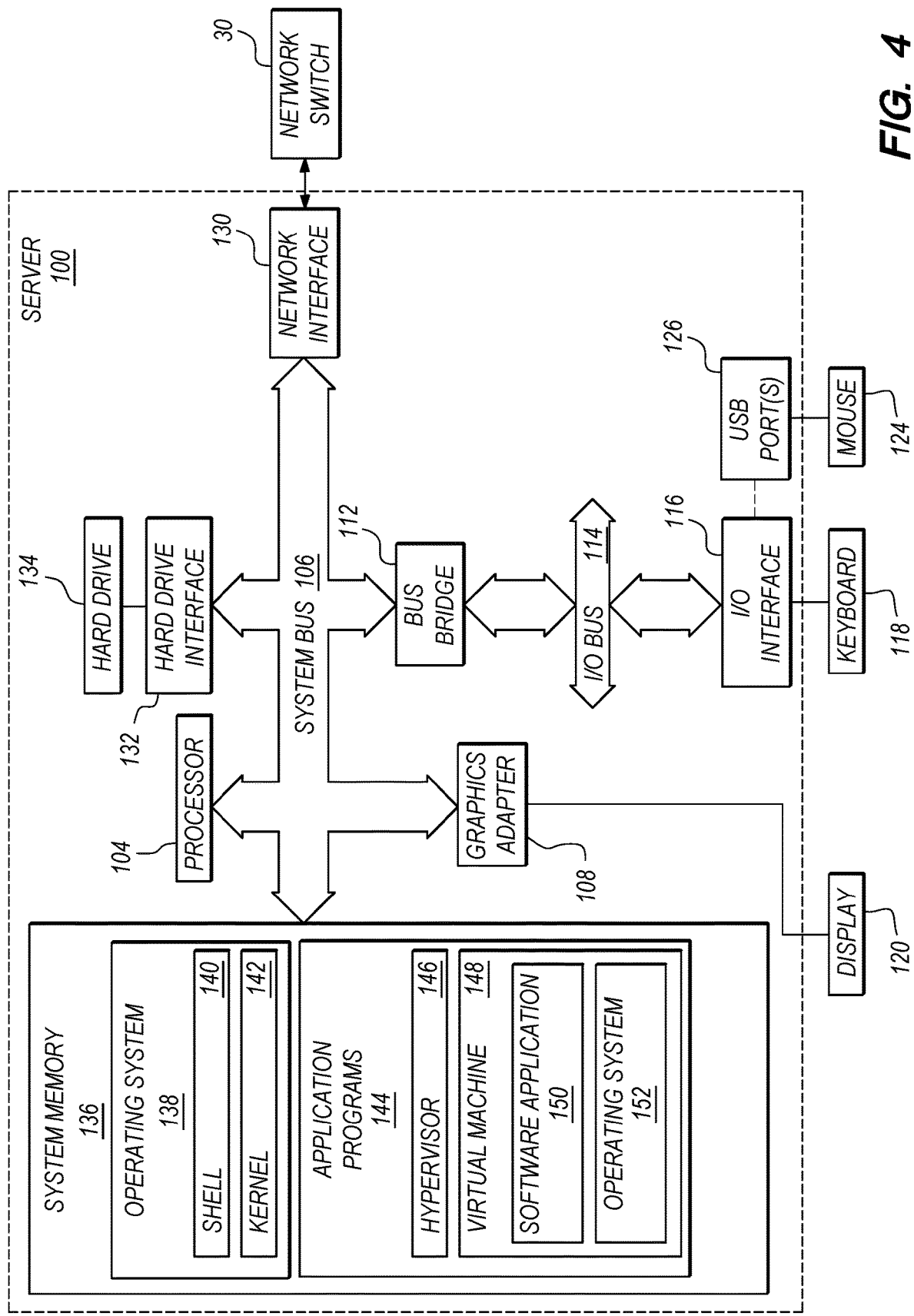
FIG. 4 is a diagram of a server.

FIG. 4 is a diagram of a server 100 that may, without limitation, be representative of the configuration of one of the host servers 20 of FIG. 1. Furthermore, the architecture of the server 100 may, without limitation, also be generally representative of the hardware architecture of the system management server 50 and other host servers 20A However, the embodiments are not limited to the particular architecture shown.

The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 and a USB mouse 124 via USB port(s) 126. As depicted, the server 100 is able to communicate with the network switch 30 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include a hypervisor 146 and one or more virtual machine 148 for running a workload instance, such as a software application 150 and an operating system 152.

The operating system 138 for the server 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. However, the operating system 138 of this representative server 100 should not be confused with the operating system 152 that may run on the virtual machine 148. For example, each virtual machine may include and run a separate operating system to support the software application 150 that runs within the virtual machine 148.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   identifying a first dataset that is being used by a first workload running on a first host server within a computing system and a second workload running on a second host server within the computing system, wherein the first dataset is currently stored on local storage of one or more of the host servers, and wherein each of the host servers within the computing system are connected for communication over a network including a network switch;
   identifying a data storage device that is directly attached to the network switch within the network;
   causing the identified dataset to be migrated to the identified data storage device; and
   causing the first and second workloads to access the identified dataset on the identified data storage device.

2. The computer program product of claim 1, the operations further comprising:
   identifying a second dataset that is being used by a single workload running on a third host server within the computing system, wherein the second dataset is currently stored on the identified data storage device that is directly attached to the network switch;
   causing the second dataset to be migrated to local storage of the third host server; and
   causing the single workload to access the second dataset on the local storage of the third host server.

3. The computer program product of claim 1, wherein the computing system includes multiple network switches, each network switch having a data storage device directly attached to the network switch, and wherein the operation of identifying the data storage device that is directly attached to the network switch includes the operation of identifying the data storage device that is attached to the network switch that is an equal number of hops from the first host server and the second host server.

4. The computer program product of claim 1, wherein the operation of identifying a dataset that is being used by a first workload running on a first host server within a computing system and a second workload running on a second host server within the computing system includes the operations of:
   detecting read and/or write commands directed at the dataset;
   inspecting the read and/or write commands to identify the workloads that are sending the read and/or write commands; and
   identifying, for each workload sending the read and/or write commands, the host server that is running the workload.

5. The computer program product of claim 1, wherein the operation of causing the identified dataset to be migrated to the identified data storage device includes the operation of causing the identified dataset to be migrated from local storage of one of the host servers to the identified data storage device.

6. The computer program product of claim 1, wherein the workload is a virtual machine workload.

7. The computer program product of claim 6, the operations further comprising:
   causing, for each host server, provisioning of a virtual machine for control of data storage for virtual machine workloads running on the host server.

8. The computer program product of claim 1, the operations further comprising:
   causing the first and/or second workloads to use a data storage device that is directly attached to a second network switch within the network as cache.

9. A computer program product comprising a non-volatile computer readable medium and non-transitory program instructions embodied therein, the program instructions being configured to be executable by a processor to cause the processor to perform operations comprising:
   identifying a first dataset that is being used by a first workload running on a first host server within a computing system and a second workload running on a second host server within the computing system, wherein the first dataset is currently stored on a data storage device selected from local storage directly attached the first host server and/or a data storage device that is directly attached to a first network switch, wherein each of the host servers within the computing system are connected for communication over a network including the first network switch;
   causing the first workload and the second workload to access the identified dataset on the selected data storage device; and
   causing the second workload to use a data storage device within the network as cache, wherein the data storage device used as cache is at least one hop closer to the second host server than the selected data storage device.

10. The computer program product of claim 9, wherein the first data set is stored on the local storage directly attached to the first host server, and the data storage device that the second workload is caused to use as cache is directed attached to the first network switch.

11. The computer program product of claim 9, wherein the first data set is stored on the data storage device that is directly attached to the first network switch, and the data storage device that the second workload is caused to use as cache is directed attached to a second network switch within the network.

12. A computer program product comprising a non-volatile computer readable medium and non-transitory program instructions embodied therein, the program instructions being configured to be executable by a processor to cause the processor to perform operations comprising:

identifying a workload that is to be run on a host server within a computing system including a network;

identifying a dataset that will be used by the workload;

determining whether local data storage of the host server has a sufficient amount of available data storage capacity to store the dataset;

identifying a data storage device that is directly attached to a network switch within the network;

storing at least a portion of the identified dataset on the identified data storage device in response to determining that the local data storage device of the host server does not have a sufficient amount of available data storage capacity to store the dataset; and causing the workload to send access requests for the at least a portion of the identified dataset to the identified data storage device.

13. The computer program product of claim 12, the operations further comprising:

storing the entire identified dataset on the local data storage of the host server in response to determining that the local data storage device of the host server has a sufficient amount of available data storage capacity to store the entire identified dataset.

14. The computer program product of claim 12, wherein the workload is to be migrated to the host server from another host server within the computing system.

15. The computer program product of claim 12, wherein the operation of storing at least a portion of the identified dataset on the identified data storage device includes moving portions of the identified dataset from multiple host servers within the computing system.

16. The computer program product of claim 12, wherein the computing system includes multiple network switches, each network switch having a data storage device directly attached to the network switch, and wherein the operation of identifying a data storage device that is directly attached to a network switch within the network includes the operation of identifying a data storage device that is directly attached to a network switch that is the fewest number of hops from the host server.

17. The computer program product of claim 12, wherein the operation of storing at least a portion of the identified dataset on the identified data storage device includes the operation of storing the entirety of the identified dataset on the identified data storage device.

18. The computer program product of claim 12, wherein the operation of storing at least a portion of the identified dataset on the identified data storage device includes storing a portion of the identified dataset on the identified data storage device and storing another portion of the identified dataset on the local data storage device of the host server running the workload.

19. The computer program product of claim 12, wherein the workload is a virtual machine workload.

20. The computer program product of claim 19, the operations further comprising:

provisioning, for each host server, a virtual machine for control of data storage for virtual machine workloads running on the host server.

* * * * *